United States Patent Office 2,734,072
Patented Feb. 7, 1956

2,734,072

ACRYLONITRILE PROCESS AND CATALYST

Charles R. Harris, Lockport, N. Y., assignor to E. I. du Pont de Nemours and Company, Wilmington, Del., a corporation of Delaware No Drawing. Application May 28, 1952,
Serial No. 290,564

16 Claims. (Cl. 260—465.3)

This invention relates to the improvement of the manufacture of acrylonitrile by the reaction of hydrocyanic acid with acetylene and, more particularly, to carrying out the reaction in the vapor phase in the presence of a promoted catalyst supported on inert support.

In the vapor phase production of acrylonitrile from acetylene and hydrogen cyanide employing as catalyst an alkaline material supported on an inert solid, there is an initial period of several hours during which the catalyst performs poorly. As the process continues to operate, the catalyst gradually comes up to a fair performance. The poor early performance of the supported catalyst manifests itself in heavy carbon deposition on the catalyst and in a production of excessive amounts of high boiling by-products, such as aceto- and propionitriles and other residues. This poor initial performance is very costly in the operation of a commercial process for the production of acrylonitrile in that raw materials go to waste products and in that the by-product must be separated carefully from the acrylonitrile by fractional distillation. Catalyst life is also shortened in that a heavy deposit of carbon is formed at a rapid rate initially and thus decreases the over-all productive life.

An object of the present invention is to provide an improved catalytic process for reacting acetylene and hydrogen cyanide to produce acrylonitrile. A further object is to provide an improved catalyst for this reaction. Another object is to activate the catalyst so as to produce an increased yield of acrylonitrile during the initial period of reaction. Further objects will be apparent from the following description of my invention.

In pursuit of these objectives, I have discovered that the initial production of acrylonitrile can be materially improved and the formation of undesirable side reactions can be diminished by adding a small amount of a bismuth compound to the catalyst, such as an alkali metal carbonate, which is supported on a relatively inactive material, such as glowed wood charcoal or silicon carbide.

EXAMPLE I 52 grams of sodium carbonate and 53 grams of potassium carbonate were dissolved in 1.5 liters of water. 12 grams of bismuth carbonate ($Bi_2O_3 \cdot CO_2 \cdot H_2O$) powder was then suspended in the solution. Into this aqueous mixture was thoroughly stirred 1184 grams (approximately 3.5 liters) of wood charcoal which had previously been devolatilized by heating to about 1000° C. in a closed retort and then broken up into particles of approximately 20–150 mesh. From the slurry thus obtained, excess water was evaporated by heating under vacuum with a steam-heated water bath. The free-flowing powder obtained was then transferred to a 64 mm. I. D. x 5 ft. high tube and heated to 500° C. in a stream of nitrogen flowing at about 1 foot per second superficial linear velocity to remove the last traces of moisture. Analysis of the catalyst by well established chemical methods showed it to contain: potassium—2.18%; sodium—1.48%; and bismuth—0.57%.

Two liters of the catalyst thus prepared was charged into a 64 mm. I. D. x 4 ft. high tube and heated to approximately 450° C. in a stream of nitrogen. At this temperature, the nitrogen flow was shut off and a gaseous mixture consisting of 7.8 liters per minute of acetylene, 10.8 liters per minute of hydrogen and 2.2 liters per minute of hydrogen cyanide measured at 0° C. and 760 mm absolute pressure was passed through the fluidized solids catalyst. As reaction proceeded, the temperature in the catalyst increased to 500° C. and was maintained between 492° and 504° C. over the entire height of the fluidized solids catalyst bed for 6.33 hours.

The product gases were first passed through a water-cooled condenser and then through a condenser cooled with trichlorethylene-Dry Ice mixture. The condensates obtained during the second hour and the sixth hour of operations were collected as separate portions. The condensates wert distilled separately to obtain the relative yields of pure acrylonitrile. Yields of acrylonitrile from hydrogen cyanide were 85.7% and 94.0% for the second hour and the sixth hour respectively.

EXAMPLE II

A catalyst was prepared using another sample of the same devolatilized charcoal in a manner similar to that used in Example I but without the incorporation of the bismuth salt. 58 grams each of the sodium and potassium carbonates were deposited on 1150 grams of charcoal. The finished catalyst contained 2.17% potassium and 1.59% sodium according to the chemical analysis.

A 2-liter volume of this catalyst preparation was evaluated by the same procedure described in Example I. Yields of acrylonitrile from hydrogen cyanide were 77.7% and 85.6% for the second and the sixth hour respectively.

A comparison of the by-product formation obtained in the foregoing examples further shows the improvement obtained by the incorporation of bismuth salt into the catalyst preparation.

*By-product in pounds per 100 pounds acrylonitrile*

|  | Example I | | Example II | |
|---|---|---|---|---|
| Sample time | Second hour | Sixth hour | Second hour | Sixth hour |
| By-product nitriles | 4 | 1 | 13 | 7 |
| High-boiling residues | 10 | 6 | 14 | 9 |
| Deposit on catalyst during 6-hour period | 7 | | 9 | |

Another modification of the preparation method used in the foregoing examples also produced catalyst which gave equally satisfactory results. For example, equal weight amounts of sodium and potassium carbonates were dissolved in water, 20–100 mesh charcoal was stirred into a volume of solution equal to that of the charcoal and the solution allowed to stand about 30 minutes. Excess liquor was then filtered off; the filter cake containing about 50% solids was transferred to shallow pans and dried at 140° C. in an oven. The dried material was then screened through 20 mesh to remove agglomerated clusters. Free-flowing powders were thus obtained suitable for use in either stationary or fluidized solids reactors. The amount of carbonates on the finished catalyst corresponded to the concentration and amount of solution retained in the filter cake. When bismuth salt was added to the carbonate solution, this was found to be all retained in the filter cake so that only the amount required in the finished catalyst was added to the alkali carbonate solution. The following additional comparison shows the results obtained with catalysts prepared on a poorer grade of charcoal.

| Bismuth salt in catalyst | 1% | | None | |
| --- | --- | --- | --- | --- |
| Sample time | Second hour | Sixth hour | Second hour | Sixth hour |
| Yield on hydrogen cyanide | 79 | 84 | 60 | 83 |
| By-products in Pounds Per 100 Pounds Acrylonitrile: | | | | |
| By-product nitriles | 11 | 7 | 31 | 9 |
| High-boiling residues | 14 | 12 | 30 | 10 |
| Deposit on catalyst during 6-hour period | 12 | | 23 | |

I have also used a bismuth promoted catalyst supported on silicon carbide of various mesh sizes comparable to charcoal. Other inert catalyst supports can also be used provided they do not contain iron or copper.

Illustrative of other materials which can be used as catalyst support are: various forms of unactivated carbon, such as charcoal, graphite, coke, coal, and the like; alumina; pumice; alundum; vitreous silica; and insulating brick. Also suitable are silicon carbide, beryl and calcium sulfate. Magnesium sulfate, porcelain, clays of low iron content and various other similar materials may also be used. Other refractory crystalline minerals may be used, such as feldspar, barite, and fluorspar, provided they are low in catalytic impurities, especially iron. Marble chips, magnesium oxide and other materials can be used as catalyst supports. A porous support is generally preferable over a non-porous support although this is not important in all cases.

As to particular mesh size of catalyst carrier or support, I do not limit myself except that very fine material must be avoided because the gas stream will carry it out of the fluidized solids reaction zone whereas if the particles are too large, operation by way of fluid-solids techniques will be inefficient or even impossible. If a stationary catalyst bed is to be used for making acrylonitrile then there is greater leeway as to particle size and as to particle size distribution. In general, in stationary catalyst beds, it is possible to use considerably larger sizes than for fluidized solids beds. Techniques for stationary solid catalyst beds are directed, as is well known, to optimum contact of reaction gases with the catalyst consonant with minimum pressure drop and other factors essential for good process performance. Particle size and reaction gas flow must be so related that very little or no catalyst will be blown out of the reaction zone.

As the catalytic agent to be supported on inactive support and to be activated by a bismuth additive, I can use other salts of alkali metals in place of their carbonates. I can also use them in varying proportions even to the extent of excluding either the potassium or the sodium compound. Alkali metal cyanides are suitable, as well as their hydroxides, borates and the like.

While the preferred catalyst used in my improved acrylonitrile process contains between 0.5 to 1.5% of bismuth as $Bi_2O_3$, larger or smaller amounts will also be useful such as between 0.2 to 2.5% of the entire catalyst composition including the carrier. Less than 0.2% of bismuth compound has little significant effect in suppressing undesired side reactions while no further significant increase in the efficiency can be obtained with more than 2.5% $Bi_2O_3$. Still larger amounts of bismuth compounds may be used provided the cost of this material is not a significant factor.

Bismuth activator may be added to the catalyst in other forms than the carbonate. Examples of other bismuth compounds suitable as additives are bismuth oxide, bismuth acetate, bismuth oxalate, bismuth hydroxide, and other forms governed principally by availability and cost. Such bismuth compounds have the common characteristic that at the temperature of the catalyzed formation of acrylonitrile from hydrogen cyanide and acetylene they are converted to the oxide, $Bi_2O_3$.

The present invention provides an improved catalyst for the vapor phase synthesis of acrylonitrile, productive of increased yield of product and decrease in carbon deposition on the catalyst.

I claim:

1. In the process for the production of acrylonitrile by the reaction of acetylene with hydrogen cyanide, the step which comprises passing a gaseous mixture of said reactants at a reaction temperature through a catalyst bed consisting of inactive support impregnated with a compound selected from the group consisting of alkali metal carbonates, hydroxides, borates and cyanides, said catalyst containing upwards of about 0.2% of bismuth as $Bi_2O_3$.

2. In the process for the production of acrylonitrile by the reaction of acetylene with hydrogen cyanide, the step which comprises passing a gaseous mixture of said reactants at a reaction temperature through a catalyst bed consisting of inactive support impregnated with a compound selected from the group consisting of alkali metal carbonates, hydroxides, borates and cyanides, said catalyst containing about 0.2 to 2.5% of bismuth as $Bi_2O_3$.

3. In the process for the production of acrylonitrile by the reaction of acetylene with hydrogen cyanide, the step which comprises passing a gaseous mixture of said reactants at a reaction temperature through a catalyst bed consisting of inactive charcoal impregnated with alkali metal carbonate, said catalyst containing about 0.2 to 2.5% of bismuth as $Bi_2O_3$.

4. In the process for the production of acrylonitrile by the reaction of acetylene with hydrogen cyanide, the step which comprises passing a gaseous mixture of said reactants at a reaction temperature through a catalyst bed consisting of inactive support impregnated with a compound selected from the group consisting of alkali metal carbonates, hydroxides, borates and cyanides, said catalyst containing 0.5 to 1.5% of bismuth as $Bi_2O_3$.

5. In the process for the production of acrylonitrile by the reaction of acetylene with hydrogen cyanide, the step which comprises passing a gaseous mixture of said reactants at a reaction temperature through a fluidized solids catalyst consisting of inactive support impregnated with a compound selected from the group consisting of alkali metal carbonates, hydroxides, borates and cyanides, said catalyst containing upwards of about 0.2% of bismuth oxide.

6. In the process for the production of acrylonitrile by the reaction of acetylene with hydrogen cyanide, the step which comprises passing a gaseous mixture of said reactants at a reaction temperature through a fluidized solids catalyst consisting of inactive support impregnated with a compound selected from the group consisting of alkali metal carbonates, hydroxides, borates and cyanides, said catalyst containing about 0.2 to 2.5% of a bismuth oxide.

7. In the process for the production of acrylonitrile by the reaction of acetylene with hydrogen cyanide, the step which comprises passing a gaseous mixture of said reactants at a reaction temperature through a fluidized solids catalyst consisting of inactive charcoal impregnated with alkali metal carbonate, said catalyst containing about 0.2 to 2.5% of bismuth as $Bi_2O_3$.

8. In the process for the production of acrylonitrile by the reaction of acetylene with hydrogen cyanide, the step which comprises passing a gaseous mixture of said reactants at a reaction temperature through a fluidized solids catalyst consisting of inactive support impregnated with a compound selected from the group consisting of alkali metal carbonates, hydroxides, borates and cyanides, said catalyst containing 0.5 to 1.5% of bismuth as $Bi_2O_3$.

9. In the process for the production of acrylonitrile by the reaction of acetylene with hydrogen cyanide, the step which comprises passing a gaseous mixture of said reactants at a reaction temperature through a fluidized solids catalyst consisting of inactive charcoal impregnated with a compound selected from the group consisting of alkali metal carbonates, hydroxides, borates and cyanides, said catalyst containing 0.5 to 1.5% of bismuth oxide.

10. In the process for the production of acrylonitrile by the reaction of acetylene with hydrogen cyanide, the step which comprises passing a gaseous mixture of said reactants at a reaction temperature through a fluidized solids catalyst consisting of inactive charcoal impregnated with alkali metal carbonate, said catalyst containing 0.5 to 1.5% of bismuth as $Bi_2O_3$.

11. In the vapor phase process for the production of acrylonitrile the step comprising the passage of a mixture of the vapors of hydrogen cyanide and acetylene at a temperature of about 500° C. over a catalyst composed of inert support having a particle size between about 20 and 150 mesh, said inert support being impregnated with alkali metal compound selected from the group consisting of the carbonates, hydroxides, borates and cyanides, said catalyst containing between about 0.2 to 2.5% by weight of bismuth oxide.

12. A catalyst suitable for the production of acrylonitrile from acetylene and hydrogen cyanide comprising an inactive support impregnated with a compound selected from the group consisting of alkali metal carbonates, hydroxides, borates and cyanides, said catalyst containing 0.2 to 2.5% by weight of bismuth as $Bi_2O_3$.

13. A catalyst suitable for the production of acrylonitrile from acetylene and hydrogen cyanide comprising an unreactive dehydrated charcoal impregnated with a mixture of sodium and potassium carbonates, said catalyst containing 0.2 to 2.5% by weight of bismuth as $Bi_2O_3$.

14. A catalyst suitable for the production of acrylonitrile from acetylene and hydrogen cyanide comprising an unreactive dehydrated charcoal impregnated with a mixture of sodium and potassium cyanides, said catalyst containing 0.5 to 1.5% by weight of bismuth as $Bi_2O_3$.

15. A catalyst for the vapor phase production of acrylonitrile from acetylene and hydrogen cyanide comprising an unreactive dehydrated charcoal of particle size between 20 and 100 mesh and impregnated with a compound selected from the group consisting of alkali metal carbonates, hydroxides, borates and cyanides, said catalyst containing 0.2 to 2.5% by weight of bismuth oxide.

16. A catalyst for the vapor phase production of acrylonitrile from acetylene and hydrogen cyanide comprising an unreactive dehydrated charcoal of particle size between 20 and 100 mesh and impregnated with a mixture of sodium and potassium cyanides, said catalyst containing 0.5 to 1.5% by weight of bismuth oxide.

References Cited in the file of this patent

UNITED STATES PATENTS

| | | |
|---|---|---|
| 1,991,448 | Connolly et al. | Feb. 19, 1935 |
| 2,413,496 | Green et al. | Dec. 13, 1946 |
| 2,413,623 | Harris | Dec. 31, 1946 |
| 2,414,762 | Owen et al. | Jan. 21, 1947 |
| 2,419,186 | Harris et al. | Apr. 15, 1947 |
| 2,476,771 | Salzberg | July 19, 1949 |

FOREIGN PATENTS

| | | |
|---|---|---|
| 559,734 | Germany | Sept. 23, 1952 |